3,190,927
PROCESS FOR OXYALKYLATING SOLID POLYOLS
John T. Patton, Jr., Wyandotte, and Walter F. Schulz, Southgate, Mich., assignors to Wyandotte Chemicals Corporation, Wyandotte, Mich., a corporation of Michigan
No Drawing. Filed Apr. 13, 1960, Ser. No. 21,874
6 Claims. (Cl. 260—615)

This invention relates to a process for oxyalkylating solid polyols. In a more specific aspect, this invention relates to a method for producing high molecular weight products by reacting a normally-solid polyol with an alkylene oxide to produce products that are substantially free of glycols or homopolymers of the alkylene oxide used.

Methods for reacting solid polyols, such as pentaerythritol, with alkylene oxides, such as ethylene oxide, propylene oxide and butylene oxide, have been known for a considerable period of time, but the problems in this area are quite apparent from a review of the pertinent patents that have issued. Thus, Schmidt et al., U.S. 1,922,459 (1933), disclose the reaction of pentaerythritol with ethylene oxide by heating the reactants in an autoclave in the presence of boric anhydride for about 20 hours at 125° C. The incompleteness of the reaction is shown by the disclosure by Schmidt et al. that unreacted ethylene oxide was removed from the reaction products. Further development in catalysts for this reaction is disclosed by Bowman et al., U.S. 2,401,743 (1946), who disclose the reaction of pentaerythritols with alkylene oxides in the presence of a broad group of organic acids and organic acid anhydrides, such as acetic acid or acetic anhydride. Again reaction times were long and incomplete since Bowman et al. disclose that unreacted ethylene oxide was removed from the reaction product.

Brown, U.S. 2,450,079 (1948), discloses the reaction of polyhydric alcohols having at least 3 hydroxyl groups, such as pentaerythritol, with alkylene oxides by mixing the polyol with a substantial proportion of water and then reacting the mixture with an olefin oxide. The well-recognized reaction of water with an alkylene oxide interferes in this process and the product is a mixture of glycols, polymers of the alkylene oxide used, adducts of the polyol and the alkylene oxide and water. The whole problem of reacting normally-solid polyols with alkylene oxides is discussed in Monson et al., U.S. 2,766,292 (1956). Monson et al. point out that the polyols under consideration, although inherently oxyalkylation-susceptible, are solids which are substantially insoluble in any of the oxyalkylation-resistant solvents available for use in the preparation of oxyalkylated derivatives. Monson et al. point out that water is not an acceptable solvent for use in oxyalkylation processes because water reacts with such alkylene oxides to produce polyglycols during oxyalkylation. The problem is further complicated by the fact that the normally-solid, oxyalkylation-susceptible solids cannot be used in undiluted form in the oxyalkylation processes known to date or simply by liquefying such solid polyols by heating prior to introduction of the oxyalkylating agent because they undergo partial decomposition as they melt.

The problems inherent in using oxyalkylation-resistant solvents, such as xylene, in these processes is disclosed by De Groote, U.S. 2,554,667 (1951), who notes that powdered dipentaerythritol is not soluble in xylene. De Groote suggests that dipentaerythritol can be reacted with an alkylene oxide by employing enough xylene to give a paste or suspension which can be stirred in an autoclave along with the basic oxyalkylation catalyst; however, De Groote notes that there would be a problem in large-scale manufacture in handling such an initial pasty suspension or mass. A recent suggestion for helping to solve the difficulties in reacting a normally-solid polyol with an alkylene oxide is given by Anderson, U.S. 2,902,478 (1959), who discloses that high-melting, heat-sensitive polyols that are substantially insoluble in alkylene oxides can be oxyalkylated at temperatures below their melting points and decomposition temperatures and in the absence of solvent by the use of trimethylamine as a catalyst. Anderson discloses that trimethylamine catalyzes the reaction of alkylene oxides with hydroxyl compounds and also solvates or activates the solid polyols so that they react readily with alkylene oxides at low temperatures. The use of amine catalysts is not the solution the art is seeking, either, because it is well known that amine catalysts inherently are unable to catalyze reactions of alkylene oxides beyond a low molecular weight. Thus, Anderson does not provide a method for producing high molecular weight reaction products of high-melting polyhydroxy compounds and alkylene oxides.

An object of this invention is, therefore, to provide an improved method for reacting a high-melting, oxyalkylation-susceptible, organic polyol with an alkylene oxide.

A further object is to provide such an improved method in which high molecular weight products substantially free of polymers of the alkylene oxide used and substantially free of glycols are produced. A still further object is to provide a method for reacting the normally-solid polyols with alkylene oxides that does not require the use of an oxyalkylation-resistant solvent.

A still further object is to provide a method for reacting normally-solid polyols with alkylene oxides which accomplishes the foregoing objectives while making use of basic oxyalkylation catalysts that are necessary to produce high molecular weight products.

These objectives and others have been accomplished by the method of the invention which is based on the discoveries that an adduct of 1 to 4 mols of at least one alkylene oxide and a high-melting, oxyalkylation-susceptible, organic polyol is a completely suitable solvent or reaction medium for said polyol, itself, and that the polyol and the alkylene oxide reactant can be added to the adduct in the presence of an oxyalkylation catalyst in the absence of oxyalkylation-resistant solvents or water and, under appropriate reaction conditions, a reaction carried out to obtain high molecular weight reaction products. Stated broadly, the process includes mixing and heating a high melting, oxyalkylation-susceptible organic polyol having from 3 to 8 hydroxyl radicals per molecule with an adduct of 1 to 4 mols per mol of polyol of at least one alkylene oxide and said polyol and an oxyalkylation catalyst.

The process of the invention in commercial practice amounts to a generally two-stage process. The first stage of the process involves contacting a high melting, oxyalkylation-susceptible, organic polyol having from 3 to 8 hydroxyl radicals per molecule with water, an oxyalkylation catalyst and at least one alkylene oxide at a low oxyalkylation temperature. The conditions observed and proportions of reactants in the first stage are very important. About 1 to 4 mols of the alkylene oxide are used per mol of the polyol. The product of the first stage is the adduct that is used thereafter as the solvent and reaction medium for subsequent reaction with the alkylene oxide to produce the high molecular weight product that is desired. Although, as stated, the adduct produced in the first stage is usually the adduct that is used as the reaction medium for further reaction between the polyol and alkylene oxide, a low molecular weight adduct of one polyol, such as pentaerythritol and 2 mols of propylene oxide, can be used as the reaction medium for reaction of a different polyol of the type contemplated herein, such as dipentaerythritol, and an alkylene oxide. Although the melting point of the polyols under consideration is relatively high, that is, greater than 100° C., an adduct of such a polyol with 1 to 4 mols of an alkylene oxide has a greatly reduced melting point and is usually a liquid under normal conditions. The reason for this is probably that the symmetry of the polyol molecule is broken when such an adduct of the polyol is formed resulting in a lower melting product. It is desirable to use the lowest possible proportion of alkylene oxide in the first stage that is necessary to reduce the melting point of the polyol so that the alkylene oxide reacts with the hydroxyl groups of the polyol rather than with water which is present in the system or with itself to form polymers or glycols.

After the initial adduct is prepared as described above, water and volatile materials are stripped from the adduct. The catalyst concentration may have been adequate in the first stage for subsequent reaction between the alkylene oxide and additional polyol. If so, additional catalysts need not be added; if not, additional catalyst is mixed with the adduct, fresh and additional polyol is mixed with the adduct and the alkylene oxide reactant is introduced under appropriate oxyalkylation conditions and the reaction is carried forward.

The advantages of this process should be quite apparent. Only small amounts of glycol or alkylene oxide polymers, that are undesired by-products, are formed in the first stage because of the proportions of reactants used and the low oxyalkylation temperature that is employed. The small amount of such undesired by-products that is produced is diluted to an insignificant amount by the additional reactants, polyol and alkylene oxide, that are used in the second and any subsequent stages of the reaction. The second and subsequent stages of the reaction are carried out with no water or other solvent which contribute to impurities and undesired by-products.

The polyols that are used in the process are high-melting, oxyalkylation-susceptible, organic polyols having from 3 to 8 hydroxyl radicals per molecule. Pentaerythritol is a prime example since it has a melting point of 261° C. and has 4 hydroxyl groups. Other examples of such polyols are trimethylolethane having a melting point of 202° C. and 3 hydroxyl groups, dipentaerythritol having a melting point of about 222° C. and 6 hydroxyl groups, tripentaerythritol having a melting point of 248–250° C. and 8 hydroxyl groups, inositol having 6 hydroxyl groups, the dextro form of which having a melting point of 247° C. and the levo form of which having a melting point of 238° C., disaccharides such as sucrose having a melting point of 160° C. and 8 hydroxyl groups, monosaccharides such as glucose having a melting point of 147° C. and 5 hydroxyl groups, sorbitol having a melting point of 111° C. and 6 hydroxyl groups and fructose having a melting point of 105° C. and 5 hydroxyl groups, and the like. The advantage of the process for the oxyalkylation of saccharides such as sucrose is apparent when one considers that when one heats to a good oxyalkylation temperature, such as 125° C., a sugar, such as sucrose, together with sodium hydroxide, a basic oxyalkylation catalyst, the result is caramelization of the sugar producing a brown color which is undesirable in oxyalkylated products of sucrose. Also, when sugar is heated with caustic, fragmentation occurs to form saccharinic acids and other decomposition products.

The alkylene oxides that are used are the vicinal oxides, that is, those in which the oxygen atom is attached to two adjacent aliphatic carbon atoms. Mixtures of such alkylene oxides can also be used and examples of the alkylene oxide reactants are ethylene oxide, 1,2-propylene oxide, 1,2- and 2,3-butylene oxides, isobutylene oxide, butadiene monoxide, styrene oxide, cyclohexene oxide, butadiene dioxide, methyl glycidyl ether, phenyl glycidyl ether, and the like. A distinction is made, however, between the use of ethylene oxide and any other of the vicinal alkylene oxides listed and referred to. Ethylene oxide can be used in the process of the invention but it is less desirable than the alkylene oxides having at least 3 carbon atoms because, when ethylene oxide reacts with the polyol, the hydroxyl group produced when the ethylene oxide ring opens is a primary hydroxyl group whereas the hydroxyalkyl product obtained using the higher alkylene oxides under basic catalysis contains secondary hydroxyl groups. The efficacy of the first stage of the process is based, to a large extent, on the higher reactivity of alkylene oxides with the primary hydroxyl groups of the polyol, itself, and, when ethylene oxide is used, it is just as likely to react with the primary hydroxyl group of a hydroxyethyl radical as with the primary hydroxyl group of the polyol. The use of higher alkylene oxides insures even distribution about the molecule of the starting polyol of the hydroxyalkyl groups since the higher alkylene oxides preferentially react with the primary hydroxyl group of the starting polyol rather than the secondary hydroxyl groups in the hydroxalkyl radicals resulting from ring opening of the higher alkylene oxides. This preferential reaction of alkylene oxides with primary hydroxyl groups provides the basis for a continuous process embodiment of the invention using alkylene oxides having at least 3 carbon atoms in which the first stage of the process need only be carried out once and, thereafter, the desired adduct which is needed as a solvent for the second stage and high molecular weight oxyalkylation products are produced continuously in separate reaction zones.

The catalyst that is used is a conventional oxyalkylation catalyst that generates secondary hydroxyl groups when the oxirane ring of higher alkylene oxides is opened. These are, in general, basic catalysts, such as amines, alkali metal hydroxides, alkali metals and alkali metal alcoholates. The preferred catalysts are sodium hydroxide and potassium hydroxide. Amines are suitable although, as pointed out hereinabove, they are not adequate for producing products having a molecular weight of higher than about 400 to 600. If products having molecular weights below this range are desired, amine catalysts are quite suitable, such as trimethylamine, triethylamine, tripropylamine and other tertiary alkylamines, N-benzyl-N,N-dimethylamine, N - methylmorpholine, and the like.

The concentration of catalyst in any stage of the process depends on the molecular weight of product that is desired. If a relatively high molecular weight product is desired, such as one having a molecular weight of 1000 to 10,000 or higher, a higher catalyst concentration is used in the first stage of the process than would otherwise be necessary since the catalyst would not be removed and would be effective in subsequent reaction of the polyol with the alkylene oxide. Thus, the catalyst concentration can range from about 1 mol percent of alkali metal hydroxide, based on the polyol, to as high as 10 to 15 mol percent. A concentration of about 4 to 5 mol percent of alkali metal hydroxide is usually effective. It may be noted that amine catalysts must be replaced when the adduct formed in the first stage is stripped of water because such amine catalysts will be removed along with the water. Other basic oxyalkylation catalysts, such as sodium hydroxide, are not removed by the stripping operation and, therefore, need only be supplemented in subsequent stages to the end that the proper catalyst concentration is present to produce the molecular weight of product that is desired.

The first stage of the process is carried out using water as a solvent for the polyol. Only that amount of water need be used that permits agitation or mixing and contacting of the solid polyol with catalyst and alkylene oxide. It is not necessary that the polyol be completely dissolved in the water. The amount of water used should be that amount which permits a significant amount, such as approximately 2 to 10 weight percent, of the polyol to dissolve in the water. It will be satisfactory, of course, if a greater proportion of the polyol dissolves in the water, but it is desirable to keep the amount of water used at a minimum. This amount of water will dissolve a sufficient amount of the polyol and produce a stirrable mixture to facilitate the reaction with 1 to 4 mols of the alkylene oxide reactant. The reaction with the alkylene oxide proceeds in the aqueous solution phase of the mixture and, as the alkylene oxide reacts with the polyol in the aqueous solution phase, an additional amount of polyol dissolves in the aqueous solution phase, to permit further reaction with the alkylene oxide reactant.

A low oxyalkylation temperature is employed in the first stage of the process. The low temperature is employed in order to minimize reaction of the alkylene oxide with water in the system. For this reason, the temperature is desirably not above about 100° C. to 115° C. in the first stage of the process. The broad temperature range for oxyalkylation reactions is about 85–170° C., on the other hand. If the polyol to be oxyalkylated is difficultly soluble in water, the temperature can be raised to 110° C. or 115° C. in the first stage. The low oxyalkylation temperature, such as about 100° C., is effective for producing the adduct of 1 to 4 mols per mol of polyol of alkylene oxide and the polyol. When this adduct has been formed, the adduct is stripped in a vacuum stripping operation and subsequent reaction of fresh polyol and alkylene oxide is carried out at conventional oxyalkylation temperatures, such as about 125° C.

All of the reactions carried out in the process of this invention are carried out in closed reaction zones and the pressure need only be the autogenous pressure developed by the reactants under the conditions of the reaction. The reaction zone is purged with nitrogen or any other inert gas to remove air containing oxygen from the system, as is conventional in oxyalkylation reactions, because the polyol and the polyol adduct are oxidized to aldehydes and colored polymers if oxygen is present under the conditions of the oxyalkylation reaction.

The reaction time for the first or any subsequent stage of the process is that time required for introducing the proper amount of alkylene oxide to the system while controlling the reaction temperature at the desired level. Oxyalkylation reactions are exothermic and so the alkylene oxide must be introduced at a controlled rate so that the desired reaction temperature is not exceeded. When the pressure of the reaction systems falls to and remains at a constant value after all of the alkylene oxide reactant has been introduced, the reaction is complete.

As has been pointed out, the proportion of alkylene oxide to polyol that is employed in the first stage is very important. Desirably the lowest proportion of alkylene oxide should be used that produces an adduct with the polyol having a sufficiently reduced melting point such that it can act as a solvent and reaction medium for further reaction of fresh polyol and additional alkylene oxide. Usually a proportion of 1 to 2 mols of alkylene oxide per mol of polyol is preferred.

The process of the invention is further described by the following examples which are supplied in order to illustrate but not limit the process.

*Example 1*

A run was carried out for the purpose of oxyalkylating pentaerythritol with propylene oxide. The reactor was a steam heated autoclave and the autoclave was charged with 816 grams (6 mols) of pentaerythritol, 12 grams of potassium hydroxide, and 405.7 grams of distilled water. The autoclave was purged three times with nitrogen gas and then heated to 100° C. and its contents stirred for 20 minutes while the temperature rose to 110° C.

Propylene oxide was then introduced into the autoclave and 696 grams (12 mols) of propylene oxide were introduced over a period of about 3⅓ hours. The maximum pressure developed by the reactants was 41 p.s.i.g. and the reactants were heated and stirred at 110° C. for about 25 minutes after the propylene oxide was completely added to the autoclave.

Thereafter, the reaction mixture was cooled to 42° C. and the liquid product containing no suspended solid material was blown into a clean glass vessel. The product was stripped at 5 mm. Hg pressure at 125–126° C. for about 2½ hours. After cooling, the product was a clear liquid containing only a small amount of solid precipitate.

The product of the first stage of the run was an adduct of 2 mols of propylene oxide and pentaerythritol having a molecular weight of 252.

The pentaerythritol-propylene oxide adduct prepared as described above was employed as the solvent and reaction medium for further reaction of fresh pentaerythritol and propylene oxide. The adduct containing potassium hydroxide catalyst was charged to the autoclave. 454 grams (1.8 mols) of the pentaerythritol-propylene oxide adduct and 408 grams (3 mols) of fresh pentaerythritol were charged to the autoclave. An additional amount of 6.0 grams of potassium hydroxide was added as catalyst and the reaction mixture was heated and stirred for 30 minutes at 90° C. and then the temperature was raised to 135° C. Propylene oxide was then introduced in the amount of 2018 grams (34.8 mols) over a period of about 8 hours.

The product of the reaction between pentaerythritol and propylene oxide, after cooling and stripping, was a clear liquid which had a molecular weight of 600.

*Example 2*

Dipentaerythritol and propylene oxide were reacted in the same reaction system as described in Example 1. The amount of dipentaerythritol used was 508 grams (2.0 mols), the amount of water used was 500 grams and the amount of potassium hydroxide catalyst was 4 grams which corresponds to 0.8 mol percent based on the dipentaerythritol.

The reaction with propylene oxide was carried out at 110–112° C. and 464 grams (8.0 mols) of propylene oxide were introduced to the reactor over a period of about 3½ hours.

The product was removed from the autoclave and subjected to vacuum stripping to remove water. The product was an adduct of dipentaerythritol and 4 mols of propylene oxide.

The initial adduct of dipentaerythritol and 4 mols of propylene oxide was employed in a second stage as the solvent and reaction medium for further reaction of dipentaerythritol and propylene oxide. There was charged to the autoclave 468 grams (1.0 mol) of the dipentaerythritol-propylene oxide adduct produced in the first stage, 381 grams (1.5 mols) of fresh dipentaerythritol and 22 grams of additional potassium hydroxide catalyst. Propylene oxide was introduced at about 125° C. over a period of 3¾ hours during which time 1651 grams (28.4 mols) of propylene oxide was introduced to the system.

The product was cooled and subjected to vacuum stripping. The product was a liquid having a molecular weight by hydroxyl number test of 980. The theoretical molecular weight of the product was 1000.

*Example 3*

The solubility of pentaerythritol in an adduct of 2 mols propylene oxide and pentaerythritol was demonstrated. A 20 gram sample of an adduct of 2 mols propylene oxide and 1 mol of pentaterythritol, prepared as described in Example 1, was placed in a 125 ml. flask and heated to 125° C. 5 grams of pentaerythritol was added and it dissolved readily. An additional 5 grams of pentaerythritol was added and it dissolved readily, also.

A total of 20 grams of pentaerythritol was added to the 20 grams of adduct in the flask and all of the materials were in solution at 160° C. When a total of 40 grams of pentaerythritol were added to the 20 grams of adduct, the resulting mixture was very fluid at 170° C.

These runs demonstrate the suitability of an adduct of 2 mols of propylene oxide and 1 mol of pentaerythritol as a solvent and reaction medium for reactions of pentaerythritol and an alkylene oxide.

*Example 4*

A run was carried out to react trimethylolethane with propylene oxide by the process of the invention. An adduct of 2.8 mols of propylene oxide per mol of trimethylolethane was prepared in the first stage and this adduct was then used as the solvent and reaction medium for preparing the timethylolethane-propylene oxide reaction product having a molecular weight of 750.

In the first stage, 648 grams (5.4 mols) of trimethylolethane, 400 grams of distilled water and 45 grams (13.3 mol percent) of potassium hydroxide catalyst were charged to the autoclave. 870 grams (15 mols) of propylene oxide were introduced over a period of 3¼ hours at 124–126° C.

After cooling and vacuum stripping the product, the product was a yellow liquid having a molecular weight by hydroxyl number test of 211. The theoretical molecular weight of the product is 282.

The adduct of trimethyolethane and 2.8 mols of propylene oxide was used in a second stage by charging 506 grams (1.8 mols) of the adduct and 108 grams (0.9 mol) of trimethylolethane to the autoclave. No additional catalyst was employed. 1636 grams (28.2 mols) of propylene oxide were introduced over a period of 6¼ hours at 124–126° C.

After cooling and vacuum stripping the product, the product was a liquid having a molecular weight by hydroxyl number test of 684. The theoretical molecular weight of the product is 750.

*Example 5*

A run was carried out to react sorbitol with propylene oxide by the process of the invention. An adduct of 3 mols of propylene oxide per mol of sorbitol was prepared in the first stage of the process and this adduct was employed as the solvent and reaction medium for producing a reaction product of propylene oxide and sorbitol having a theoretical molecular weight of 874.

In the first stage of the process, 900 grams (4.9 mols) of sorbitol, 500 grams of water and 3 grams (1.1 mol percent based on the sorbitol) of potassium hydroxide catalyst were charged to the autoclave. Propylene oxide was introduced to the autoclave over a period of about 5 hours at 108–110° C. during which time 870 grams (15.0 mols) of propylene oxide were introduced to the system.

After cooling and vacuum stripping the product, the adduct was found to have a molecular weight of 328 by hydroxyl number. The product was a clear liquid containing no solid residue on visual inspection.

The adduct prepared as described above was employed as the solvent and reaction medium for further reaction of sorbitol and propylene oxide by charging 712 grams (2.0 mols) of the adduct, 364 grams (2.0 mols) of sorbitol and 6 grams (5.35 mols percent based on the polyol) of additional potassium hydroxide catalyst to the autoclave. Propylene oxide was introduced over a period of 9 hours at 125° C. in the amount of 1384 grams (23.8 mols).

After cooling and vacuum stripping the product, the product was a liquid having a molecular weight by hydroxyl number test of 618.

The process of the invention can be expressed as a continuous process in which the 2 to 4 mol alkylene oxide adduct of the solid polyol is continuously prepared in one reaction zone and a portion of that adduct is used in a second reaction zone as the solvent and reaction medium for preparing high molecular weight reaction products of the polyol and alkylene oxide in a system in which no water is present. The higher alkylene oxides having at least 3 carbon atoms should be used when the process is carried out continuously because such alkylene oxides preferentially react with the primary hydroxyl groups of the polyol, itself, instead of the secondary hydroxyl groups in the 2 to 4 mol alkylene oxide adduct of the polyol that is used as the solvent and reaction medium in the first reaction zone.

In order to employ the process of the invention in a continuous system, a 2 to 4 mol higher alkylene oxide adduct of the solid polyol is prepared, initially, in the same manner that has been described hereinabove, employing a low oxyalkylation temperature and a sufficient amount of water such that a significant amount, e.g. about 2 to 10 weight percent, or more, of the solid polyol is in solution in the water to facilitate reaction with the alkylene oxide. After preparing such a 2 to 4 mol adduct, the adduct is placed in a first reaction zone together with a catalytic amount of an oxyalkylation catalyst. The polyol that is to be the basis of the product that is desired (which can be the same as or different from the polyol used to produce the adduct that serves as the reaction medium in the first reaction zone) is passed into the first reaction zone and a stream of the alkylene oxide to be used, such as propylene oxide, is passed into the first reaction zone. The flow rate of the alkylene oxide stream into the first reaction zone is adjusted so that the molar ratio of the alkylene oxide and the additional polyol passing into the first reaction zone is about 2 to 4 mols of alklene oxide per mol of polyol. The temperature in the first reaction zone is a low oxyalkylation temperature, such as 90° C. to 110° C., and the reactants in the first reaction zone are mixed and heated to continuously produce an adduct of the polyol and 2 to 4 mols of the alkylene oxide.

The adduct produced in the first reaction zone is withdrawn from the first reaction zone and separated into a recycle product stream and a second reaction zone polyol feed stream. The recycle product stream is returned to the first reaction zone to serve as the solvent and reaction medium for further preparation of a 2 to 4 mol alkylene oxide adduct with the polyol. The portion of the first reaction zone product that is designated the second reaction zone polyol feed stream is passed into a second reaction zone together with a stream of alkylene oxide to produce the desired high molecular weight adduct. Fresh polyol is not added to the second reaction zone since the purpose here is to build up chains of oxyalkylene groups on the polyol adduct that is passed into the second reaction zone as the second reaction zone polyol feed stream. Usually, no additional catalyst will be required in the second reaction zone since the catalyst will be carried into the second reaction zone by the second reaction zone polyol feed stream. However, catalyst can easily be added to adjust its concentration in the event that this is required.

The reactants are heated and stirred in the second reaction zone at an oxyalkylation temperature which can be in the range of 110–160° C. We prefer about 125–130° C. in the second reaction zone.

Product from the second reaction zone is withdrawn and subjected to conventional purification steps, such as vacuum stripping, before passing same to storage.

It is believed that the concept of employing a low molecular weight adduct of a normally-solid polyol and an alkylene oxide as the reaction medium and solvent for the polyol, itself, when preparing high molecular weight adducts together with the concept of employing an alkylene oxide having at least 3 carbon atoms so that advantage can be taken of the preferential reaction of such an alkylene oxide with the primary hydroxyl groups of the polyol provide, for the first time, a completely practical process that can be carried out on large scale for producing high molecular weight adducts of normally-solid polyols and alkylene oxides that are substantially free of undesired by-products, such as glycols or polymers of the alkylene oxide that is used.

We claim:

1. A process for oxyalkylating a normally solid polyol, which comprises, mixing and heating to from 85° C. to 170° C. in the presence of a basic oxyalkylation catalyst (1) a vicinal alkylene oxide, (2) a normally solid organic polyol having 3 to 8 hydroxyl radicals per molecule and (3) a substantially water-free adduct of a normally solid organic polyol having 3 to 8 hydroxyl radicals per molecule with from 1 to 4 mols of a vicinal alkylene oxide per mol of said polyol, said organic polyol having a melting point of at least 100° C. and being selected from the group consisting of pentaerythritol, dipentaerythritol, tripentaerythritol, trimethylolethane, inositol, monosaccharides and disaccharides, said alkylene oxide being selected from the group consisting of ethylene oxide, propylene oxide, 1,2-butylene oxide, 2,3-butylene oxide, isobutylene oxide, butadiene monoxide, styrene oxide, cyclohexene oxide, butadiene dioxide, methyl glycidyl ether, phenyl glycidyl ether and mixtures thereof, said oxyalkylation catalyst being selected from the group consisting of alkali metal hydroxides, alkali metals and alkali metal alcoholates, the amount of said adduct employed being sufficient so that it is the solvent and reaction medium for the process and the amount of said solid organic polyol that is employed being at least sufficient so that the polyol is oxyalkylated by the vicinal alkylene oxide under the conditions of the process.

2. A process according to claim 1 wherein said polyol (2) is pentaerythritol, said adduct (3) is an adduct of pentaerythritol and propylene oxide and said alkylene oxide (1) is propylene oxide.

3. A process for oxyalkylating a normally solid polyol, which comprises, contacting a solid organic polyol having from 3 to 8 hydroxyl radicals per molecule with water, an oxyalkylation catalyst and a vicinal alkylene oxide at from 85° C. to 115° C. to produce therefrom a polyol-adduct-solvent, said polyol being soluble in the water at least to the extent of about 2 weight percent based on the weight of the water and the molar proportions of said polyol and said alkylene oxide being in the range of about 1 to 4 mols of said alkylene oxide per mol of said polyol, said polyol having a melting point of at least 100° C. and being selected from the group consisting of pentaerythritol, dipentaerythritol, tripentaerythritol, trimethylolethane, inositol, monosaccharides and disaccharides, said alkylene oxide being selected from the group consisting of ethylene oxide, propylene oxide, 1,2-butylene oxide, 2,3-butylene oxide, isobutylene oxide, butadiene monoxide, styrene oxide, cyclohexane oxide, butadiene dioxide, methyl glycidyl ether, phenyl glycidyl ether and mixtures thereof, and said oxyalkylation catalyst being selected from the group consisting of alkali metal hydroxides, alkali metals and alkali metal alcoholates, removing water from said polyol-adduct-solvent, adding and mixing additional amounts of a solid organic polyol, hereinabove defined, and a vicinal alkylene oxide, hereinabove defined, to and with said polyol-adduct-solvent in the presence of an oxyalkylation catalyst, hereinabove defined, at from 85° C. to 170° C., the additional amounts of said polyol and vicinal alkylene oxide added to said polyol-adduct-solvent being sufficient to enable the preparation of an oxyalkylated solid organic polyol having a molecular weight up to about 10,000.

4. A process for oxyalkylating a normally solid polyol, which comprises, contacting a solid organic polyol having from 3 to 8 hydroxyl radicals per molecule with water, an oxyalkylation catalyst and a vicinal alkylene oxide at from 90° C. to 110° C. to produce therefrom a polyol-adduct-solvent, said polyol being soluble in the water at least to the extent of about 2 weight percent based on the weight of the water and the molar proportions of said polyol and said alkylene oxide being in the range of about 2 to 4 mols of said alkylene oxide per mol of said polyol, said polyol having a melting point of at least 100° C. and being selected from the group consisting of pentaerythritol, dipentaerythritol, tripentaerythritol, trimethylolethane, inositol, monosaccharides and disaccharides, said alkylene oxide being selected from the group consisting of ethylene oxide, propylene oxide, 1,2-butylene oxide, 2,3-butylene oxide, isobutylene oxide, butadiene monoxide, methyl glycidyl ether, phenyl glycidyl ether and mixtures thereof, and said oxyalkylation catalyst being selected from the group consisting of alkali metal hydroxides, alkali metals and alkali metal alcoholates, removing water from said polyol-adduct-solvent, adding and mixing additional amounts of said polyol and said alkylene oxide to and with said polyol-adduct-solvent in the presence of said oxyalkylation catalyst at from about 110° C. to 160° C., the additional amounts of said polyol and alkylene oxide added to said polyol-adduct-solvent being sufficient to enable the preparation of an oxyalkylated solid organic polyol having a molecular weight up to about 10,000.

5. A process for oxypropylating pentaerythritol, which comprises, mixing and heating in the presence of a basic oxyalkylation catalyst at from 85° C. to 115° C. propylene oxide and pentaerythritol in a substantially water-free pentaerythritol-adduct-solvent, said pentaerythritol-adduct-solvent consisting essentially of an adduct of pentaerythritol and propylene oxide in the proportion of about 2 to 4 mols propylene oxide per mol pentaerythritol.

6. A continuous process for oxyalkylating a normally solid polyol, which comprises, heating and mixing at from 90° C. to 110° C. in the presence of a basic oxyalkylation catalyst a vicinal alkylene oxide, water and a solid organic polyol having 3 to 8 hydroxyl radicals per molecule and a melting point of at least 100° C., the proportions of water and said polyol being such as to produce a stirrable slurry of polyol and alkylene oxide in water and to dissolve in the water at least 2 weight percent, based on the weight of water, of said polyol and the proportions of said polyol and said alkylene oxide being about 2 to 4 mols of said alkylene oxide per mol of said polyol, thereby producing a polyol-adduct-solvent having from 2 to 4 hydroxyalkyl radicals per molecule, said solid organic polyol being selected from the group consisting of pentaerythritol, dipentaerythritol, tripentaerythritol, trimethylolethane, inositol, monosaccharides and disaccharides, said alkylene oxide being selected from the group consisting of ethylene oxide, propylene oxide, 1,2-butylene oxide, 2,3-butylene oxide, isobutylene oxide, butadiene monoxide, styrene oxide, cyclohexene oxide, butadiene dioxide, methyl glycidyl ether, phenyl glycidyl ether and mixtures thereof, said oxyalkylation catalyst being selected from the group consisting of alkali metal hydroxides, alkali metals and alkali metal alcoholates, removing water from said polyol-adduct-solvent, transferring said polyol-adduct-solvent into a first reaction zone together with a catalytic amount of said oxyalkylation catalyst, passing additional amounts of said polyol and said alkylene oxide into said first reaction zone in the proportion of from 2 to 4 mols of alkylene oxide per mol of polyol while withdrawing from said first reaction zone a first reaction zone product stream subsequently defined, heating to 90° C. to 110° C. and stirring in said first reaction zone the polyol-adduct-solvent, catalyst, polyol and alkylene oxide to produce an adduct of said polyol and said alkylene oxide having from 2 to 4 hydroxyalkyl radicals per molecule, withdrawing from said first reaction zone said last-mentioned adduct as the aforementioned first reaction zone product stream, separating said first reaction zone product stream into a recycle product stream and a second reaction zone polyol feed stream, returning said recycle product stream to said first reaction zone to serve as said polyol-adduct-solvent therein, passing into a second reaction zone said second reaction zone polyol feed stream and a stream of said alkylene oxide and stirring and heating same to 110° C. to 160° C. in the presence of a catalytic amount of said oxyalkylation catalyst, the proportions of said last-mentioned alkylene oxide stream and second reaction zone polyol feed stream being such as to produce the desired oxyalkylated polyol having a molecular weight up to about 10,000.

References Cited by the Examiner

UNITED STATES PATENTS

| 2,450,079 | 9/48 | Brown. | |
|---|---|---|---|
| 2,766,292 | 10/56 | Monson et al. | 260—615 |
| 2,902,478 | 9/59 | Anderson | 260—209 |
| 2,987,489 | 6/61 | Bailey et al. | 260—615 XR |

FOREIGN PATENTS 736,991  9/55  Great Britain.

LEON ZITVER, *Primary Examiner.*

LEON ZITVER, *Examiner.*

UNITED STATES PATENT OFFICE
CERTIFICATE OF CORRECTION

Patent No. 3,190,927                          June 22, 1965

John T. Patton, Jr., et al.

It is hereby certified that error appears in the above numbered patent requiring correction and that the said Letters Patent should read as corrected below.

Column 9, line 57, for "cyclohexane" read -- cyclohexene --.

Signed and sealed this 17th day of January 1967.

(SEAL)
Attest:

ERNEST W. SWIDER                         EDWARD J. BRENNER
Attesting Officer                                Commissioner of Patents